No. 837,134. PATENTED NOV. 27, 1906.
H. D. SHUSTER.
RAIL JOINT.
APPLICATION FILED MAY 17, 1906.
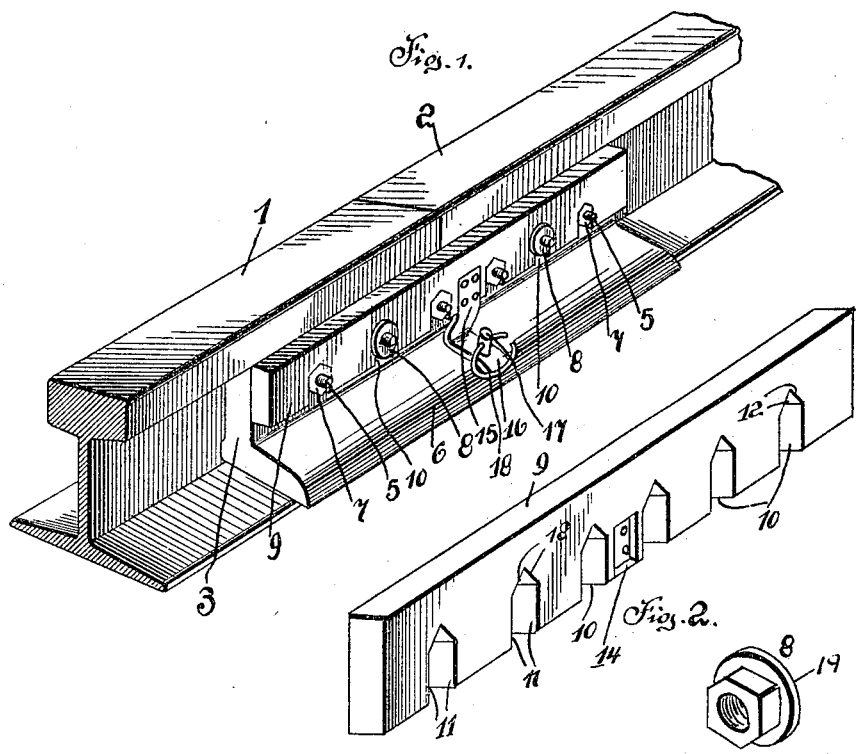
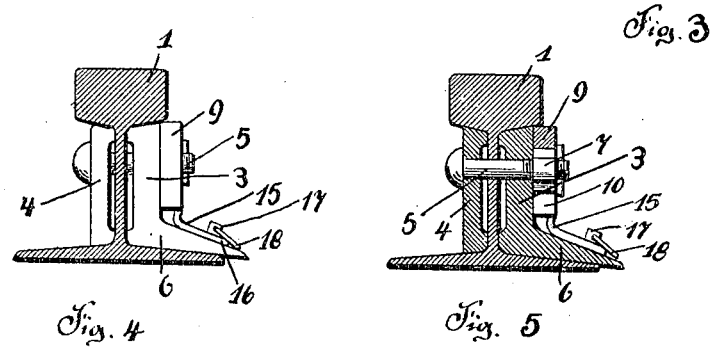
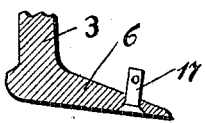
Witnesses:
C. Klostermann
Inventor.
Henry D. Shuster.
by
Attorneys.

UNITED STATES PATENT OFFICE.

HENRY D. SHUSTER, OF LEECHBURG, PENNSYLVANIA.

RAIL-JOINT.

No. 837,134.  Specification of Letters Patent.  Patented Nov. 27, 1906.

Application filed May 17, 1906. Serial No. 317,274.

*To all whom it may concern:*

Be it known that I, HENRY D. SHUSTER, a citizen of the United States of America, residing at Leechburg, in the county of Armstrong and State of Pennsylvania, have invented certain new and useful Improvements in Rail-Joints, of which the following is a specification, reference being had therein to the accompanying drawings.

This invention relates to certain new and useful improvements in nut-locks particularly designed for rail-joints and railway construction.

My invention has for its primary object the provision of positive and reliable means for simultaneously locking a plurality of nuts or burs upon their respective bolts. To this end I have devised a simple and inexpensive nut-lock which while designed particularly for rail-joints can be used for various purposes not herein specified. It is a well-known fact that the nuts of a rail-joint become loose and detached on account of the vibrations set up by rolling-stock passing over a joint. To obviate this defect, I use a special type of nut or bur and a lock-plate, said plate being placed in engagement with the nuts or burs and then secured to one of the fish bars or plates of the rail-joint.

My invention will be hereinafter more fully described and then specifically claimed, and reference will now be had to the drawings, forming part of this specification, wherein—

Figure 1 is a perspective view of a rail-joint equipped with my improved nut-lock. Fig. 2 is a detached perspective view of a lock-plate. Fig. 3 is a similar view of a nut or bur. Fig. 4 is an end view of the rail-joint. Fig. 5 is a cross-sectional view of the same, and Fig. 6 is a detail sectional view of a portion of one of the fish bars or plates of the joint.

In the accompanying drawings I have illustrated the confronting ends of two rails 1 and 2, secured together by fish-bars 3 and 4 and bolts 5, said bolts passing through said bars and the web portions of said rails. These elements are of a conventional form, with the exception of the fish-bar 3, which is flanged, as at 6, and made slightly heavier than the bar 4. In connection with the bolts 5 I employ ordinary hexagon-shaped nuts 7 and specially-formed nuts 8, these nuts constituting part of my invention.

My invention particularly resides in a locking-plate 9, corresponding in length to the fish-bar 3. The one longitudinal edge of the plate 9 is provided with a plurality of recesses 10, these recesses corresponding in number to the number of nuts 7 and 8 used in connection with a rail-joint. Each recess comprises two vertical sides 11 11 and two inclined sides 12 12, the sides 11 and 12 conforming to four sides of a hexagon-shaped nut or bur. The one side of the locking-plate intermediate its ends is formed with a recess 14, and in said recess is secured a soft metal strap 15, having a pierced end 16.

The flanged edge of the fish-bar 3 is provided with an upwardly-extending pierced pin 17, adapted to engage the pierced end 16 of the strap 15 and be retained in engagement therewith by a split link or seal 18.

The specially-formed nuts or burs 8 consist principally of caps or flanges 19, which prevent lateral displacement of the locking-plate 9 when the same is mounted upon the nuts or burs 7.

In making the fish-bar 3 slightly thicker than the bar 4 I am enabled to place the locking-plate 9 over the nuts and burs carried by the bolts 5. It is essential, however, that the nuts and burs be properly positioned upon the bolts 5 to be received by the recesses 10, which prevent said nuts and burs from rotating upon the bolts. After the locking-plate has been so placed the strap 15 is locked upon the pin 17 to prevent vertical displacement of said bar.

It will be apparent from the novel structural features of my invention that I have devised positive and available means for insuring a safe and durable connection between the rails of a joint, and I desire it to be understood that such changes in the size, proportion, and minor details of construction as are permissible by the appended claim may be resorted to without departing from the spirit and scope of the invention.

What I claim, and desire to secure by Letters Patent, is—

The combination in a rail-joint, including the fish-plates and the bolts and nuts thereof, of a plate provided with recesses on one edge thereof, said recesses adapted to fit over said nuts and hold the same against rotation, said plate being provided with a recess on one of its faces, a pin passing through an opening in one of the fish-plates, a rigid strap carried by said plate, and secured in said second-named recess, said rigid strap having an opening adapted to receive said pin, and means carried by said pin to prevent accidental displacement of said rigid strap.

In testimony whereof I affix my signature in the presence of two witnesses.

HENRY D. SHUSTER.

Witnesses:
JAMES B. KIFER,
J. I. HUNTER.